United States Patent [19]

Okazaki

[11] Patent Number: 5,148,522
[45] Date of Patent: Sep. 15, 1992

[54] INFORMATION RETRIEVAL APPARATUS AND INTERFACE FOR RETRIEVAL OF MAPPING INFORMATION UTILIZING HAND-DRAWN RETRIEVAL REQUESTS

[75] Inventor: Akio Okazaki, Yokohama, Japan

[73] Assignee: Kabushiki Kaisha Toshiba, Kawasaki, Japan

[21] Appl. No.: 656,040

[22] Filed: Feb. 19, 1991

Related U.S. Application Data

[63] Continuation of Ser. No. 470,409, Jan. 29, 1990, abandoned, which is a continuation of Ser. No. 169,479, Mar. 17, 1988, abandoned.

[30] Foreign Application Priority Data

Mar. 17, 1987 [JP] Japan .................................. 62-60120

[51] Int. Cl.$^5$ ............................................... G06F 3/14
[52] U.S. Cl. .................................. 395/161; 340/706; 382/57
[58] Field of Search .............................. 364/518–523; 395/161, 155; 340/706, 709; 382/13, 57

[56] References Cited

U.S. PATENT DOCUMENTS 4,949,388  8/1990  Bhaskaran ....................... 364/518 X

OTHER PUBLICATIONS

Tang, G. Y., "A Management System for an Integrated Database of Pictures and Alphanumerical Data", Computer Graphics and Image Processing, vol. 16, 1981, pp. 270-286.

Grosky, W. I., "Toward a Data Model for Integrated Pictorial Databases", Computer Vision, Graphics, and Image Processing, vol. 25, 1984, pp. 371-382.

Primary Examiner—David L. Clark
Attorney, Agent, or Firm—Oblon, Spivak, McClelland, Maier & Neustadt

[57] ABSTRACT

An interface, adapted for receiving information composed of symbols, characters, and diagrams representing a spatial positional relationship and used as a retrieval request, comprises an entry device for entering a two-dimensional image, and a retrieval request interpreting device for recognizing elements forming the entered image, such as symbols, characters, and diagrams, and determining a two-dimensional spatial relationship between elements so as to determine retrieval conditions. Information retrieval is executed on the basis of the retrieval conditions determined by the retrieval request interpreting device. Thus, a user is allowed to enter a retrieval request in two-dimensional image form, namely, in an easily intelligible form and in a timesaving manner. This enables makes it possible to retrieve easily sophisticated information as well.

9 Claims, 19 Drawing Sheets

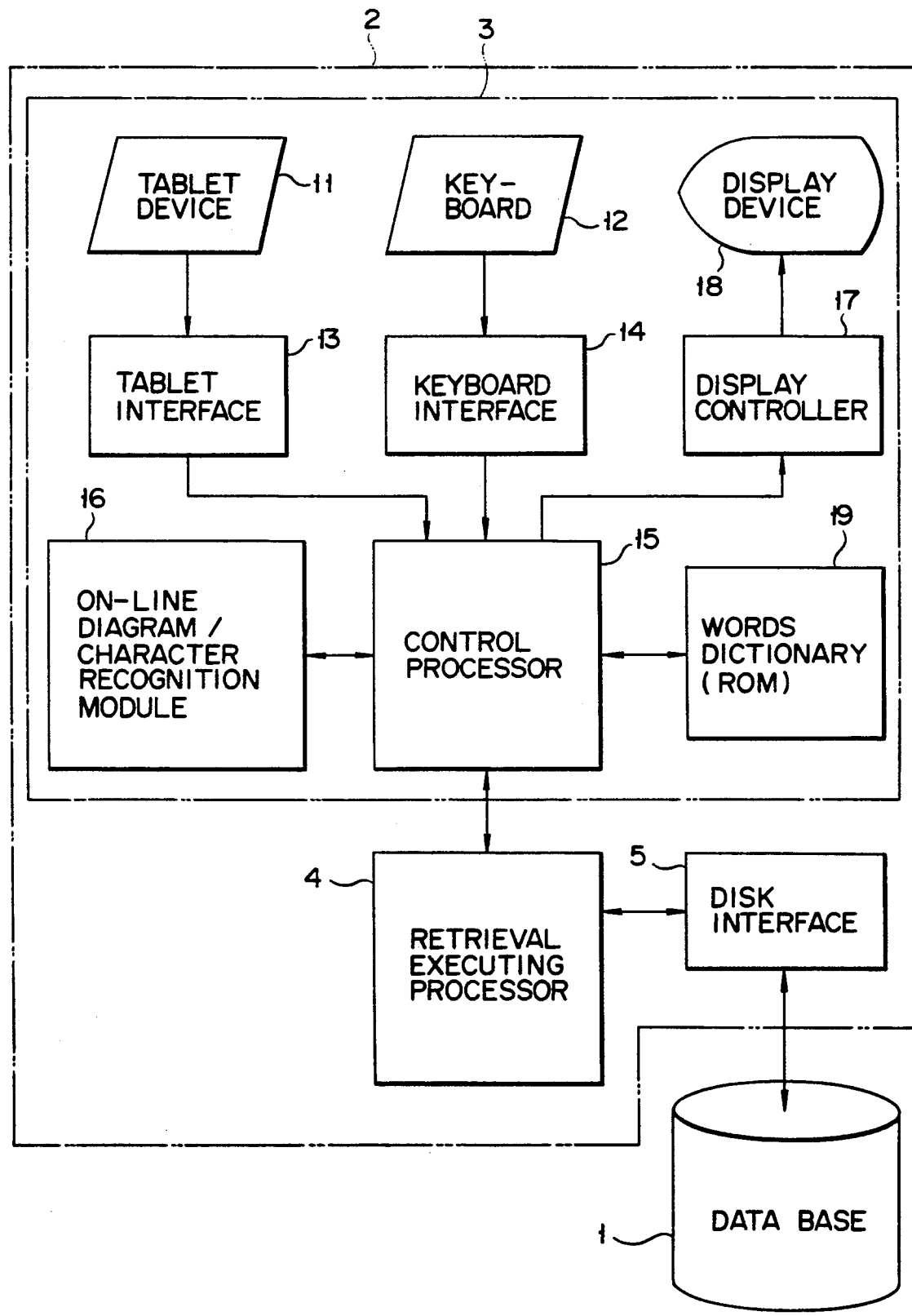
F I G. 1

FIG. 2

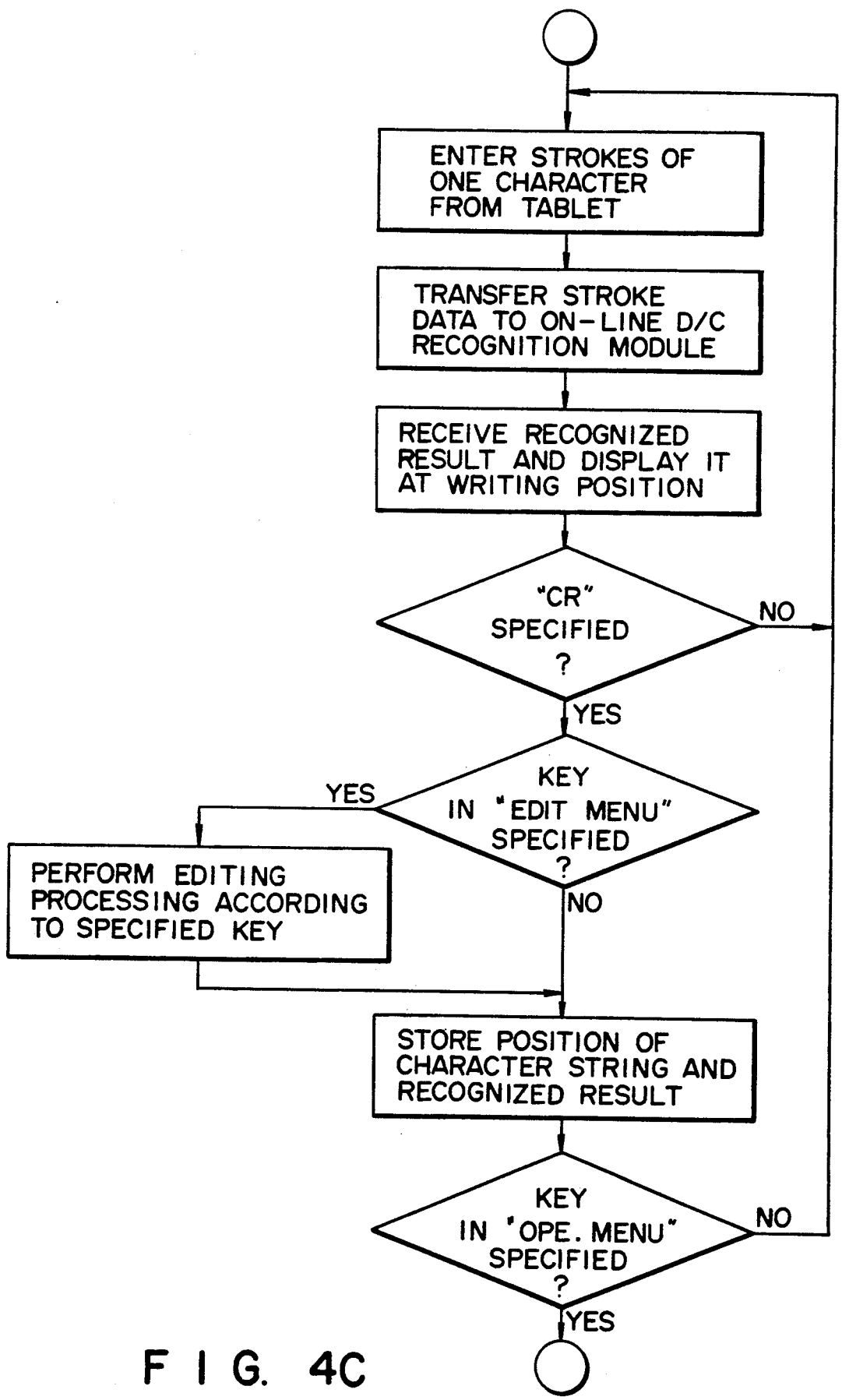
F I G. 4C

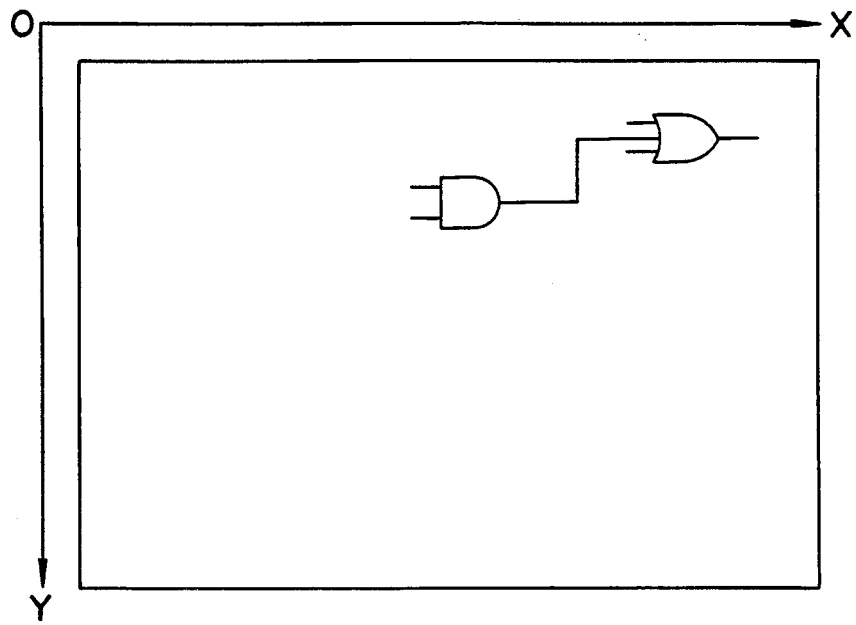
F I G. 5
RETRIEVAL TABLE
| ID NO. | ELEMENT | POSITION | | CONNECTION | | | | | |
|---|---|---|---|---|---|---|---|---|---|
| | | X | Y | INPUT | | | | | OUTPUT |
| | | | | 1 | 2 | 3 | 4 | 5 | |
| 1 | "AND" | $X_1$ | $Y_1$ | | | | | | 3 |
| 2 | "OR" | $X_2$ | $Y_2$ | | 4 | | | | |
| 3 | TURNING POINT | $X_3$ | $X_3$ | 1 | | | | | 4 |
| 4 | TURNING POINT | $X_4$ | $X_4$ | 3 | | | | | 2 |
F I G. 7

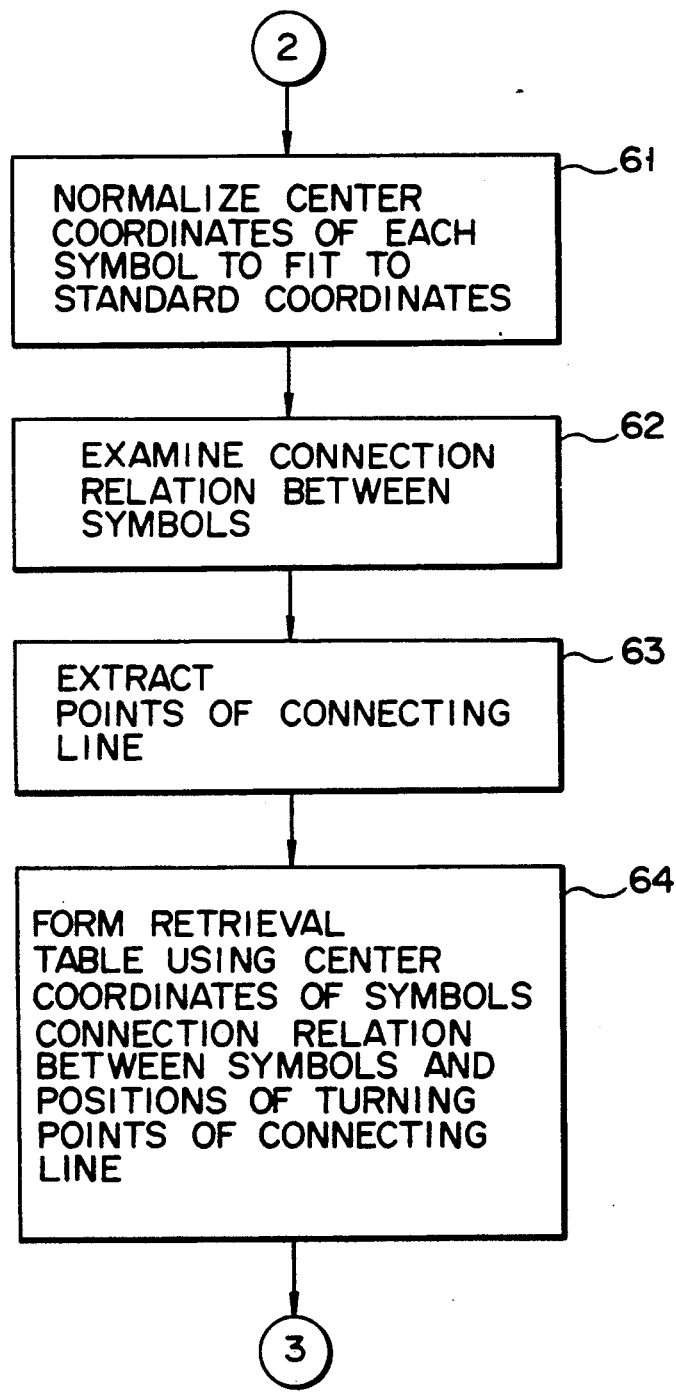
F I G. 6

"AND" TABLE

| ID NO. | POSITION | | CONNECTION | | | | | |
|---|---|---|---|---|---|---|---|---|
| | | | INPUT | | | | | OUT-PUT |
| | X | Y | 1 | 2 | 3 | 4 | 5 | |
| ⋮ | ⋮ | ⋮ | | | | | | |
| 3 | ⋮ | ⋮ | | | | | | |
| 4 | $X_1$ | $Y_1$ | | | | | | |
| 5 | ⋮ | ⋮ | | | | | | |

"OR" TABLE

| ID NO. | POSITION | | CONNECTION | | | | | |
|---|---|---|---|---|---|---|---|---|
| | | | INPUT | | | | | OUT-PUT |
| | X | Y | 1 | 2 | 3 | 4 | 5 | |
| 1 | ⋮ | ⋮ | | | | | | |
| 2 | $X_2$ | $Y_2$ | | | | | | |
| 3 | ⋮ | ⋮ | | | | | | |

TURNING POINT TABLE

| ID NO. | POSITION | | CONNECTION | |
|---|---|---|---|---|
| | X | Y | INPUT | OUTPUT |
| 1 | ⋮ | ⋮ | | |
| 2 | $X_4$ | $Y_4$ | | |
| 3 | $X_3$ | $Y_3$ | | |

FIG. 8

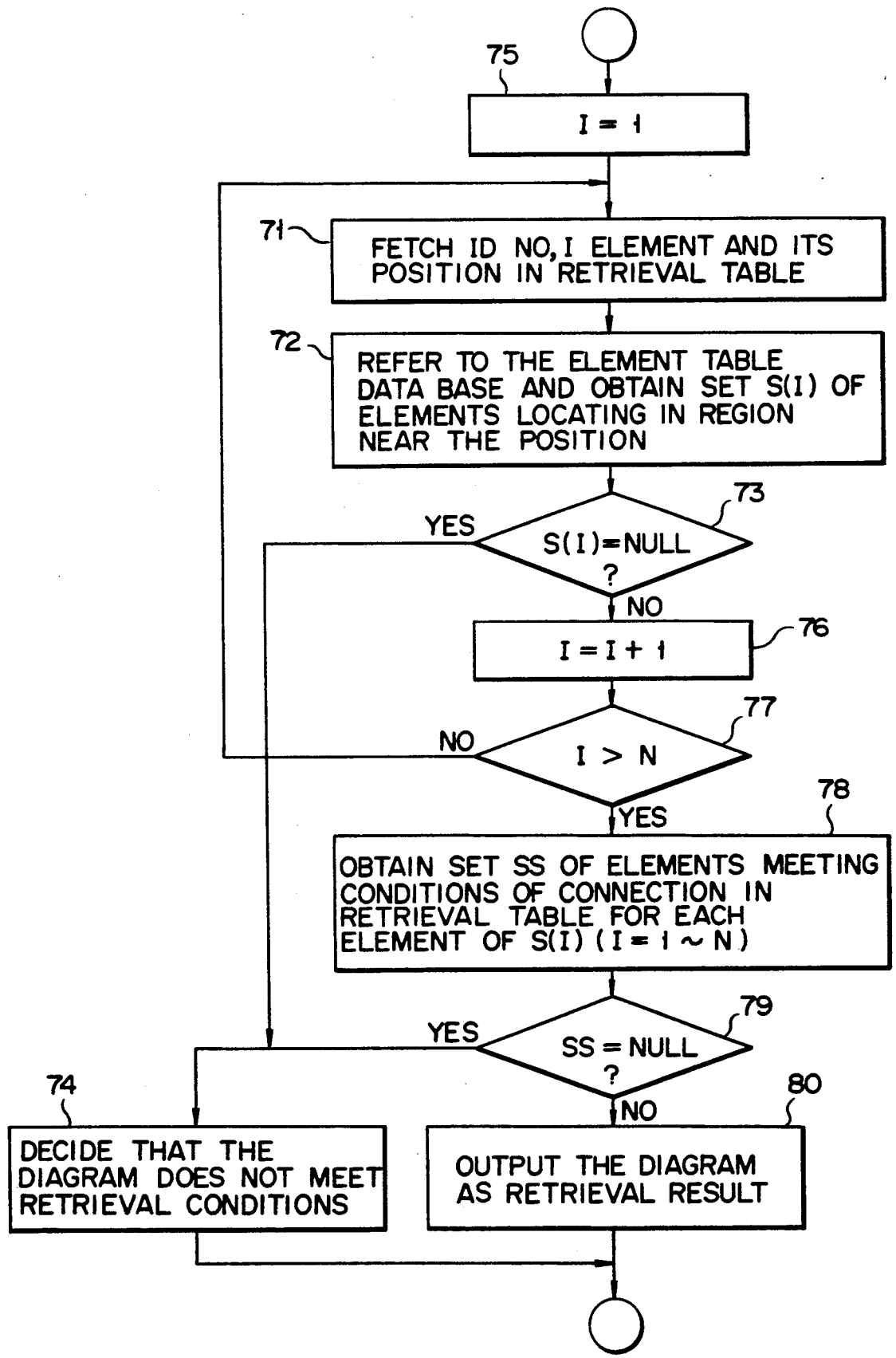
F I G. 9

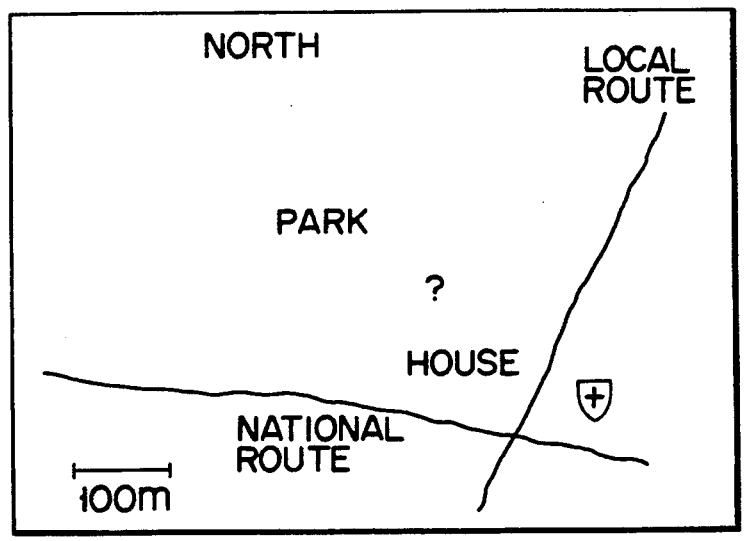
F I G. 10
| OBJECT FOR RETRIEVAL | | | HOUSE |
|---|---|---|---|
| NEAR POINT ELEMENTS | 1 | NAME | PARK |
| | | DIRECTION | NORTH WEST |
| | | DISTANCE | 100 m |
| | 2 | NAME | HOSPITAL |
| | | DIRECTION | EAST |
| | | DISTANCE | 200 m |
| | 3 | NAME | |
| | | DIRECTION | |
| | | DISTANCE | |
| NEAR LINE ELEMENTS | 1 | NAME | NATIONAL ROUTE |
| | | DIRECTION FOR SHORTEST DISTANCE | EAST SOUTH |
| | | SHORTEST DISTANCE | 100 m |
| | 2 | NAME | LOCAL ROUTE |
| | | DIRECTION FOR SHORTEST DISTANCE | SOUTH WEST |
| | | SHORTEST DISTANCE | 100 m |
F I G. 12

HOUSE TABLE

| ID NO. | POSITION | |
|---|---|---|
| | X | Y |
| 1 | | |
| 2 | | |
| 3 | | |
| 4 | | |
| 5 | | |
| ⋮ | | |
| ℓ | | |

HOSPITAL TABLE

| ID NO. | POSITION | |
|---|---|---|
| | X | Y |
| 1 | | |
| 2 | | |
| 3 | | |
| 4 | | |
| 5 | | |
| ⋮ | | |
| m | | |

PARK TABLE

| ID NO. | POSITION | |
|---|---|---|
| | X | Y |
| 1 | | |
| 2 | | |
| 3 | | |
| 4 | | |
| ⋮ | | |
| n | | |

NATIONAL ROUTE TABLE

| ID NO. | TRAIN OF POSITIONAL COORDINATES |
|---|---|
| 1 | $(x_1,y_1)(x_2,y_2)(x_3,y_3)$ ---- |
| 2 | |
| 3 | |
| 4 | |
| ⋮ | |
| p | |

LOCAL ROUTE TABLE

| ID NO. | TRAIN OF POSITIONAL COORDINATES |
|---|---|
| 1 | $(x_1,y_1)(x_2,y_2)(x_3,y_3)$ --- |
| 2 | |
| 3 | |
| 4 | |
| ⋮ | |
| q | |

FIG. 13

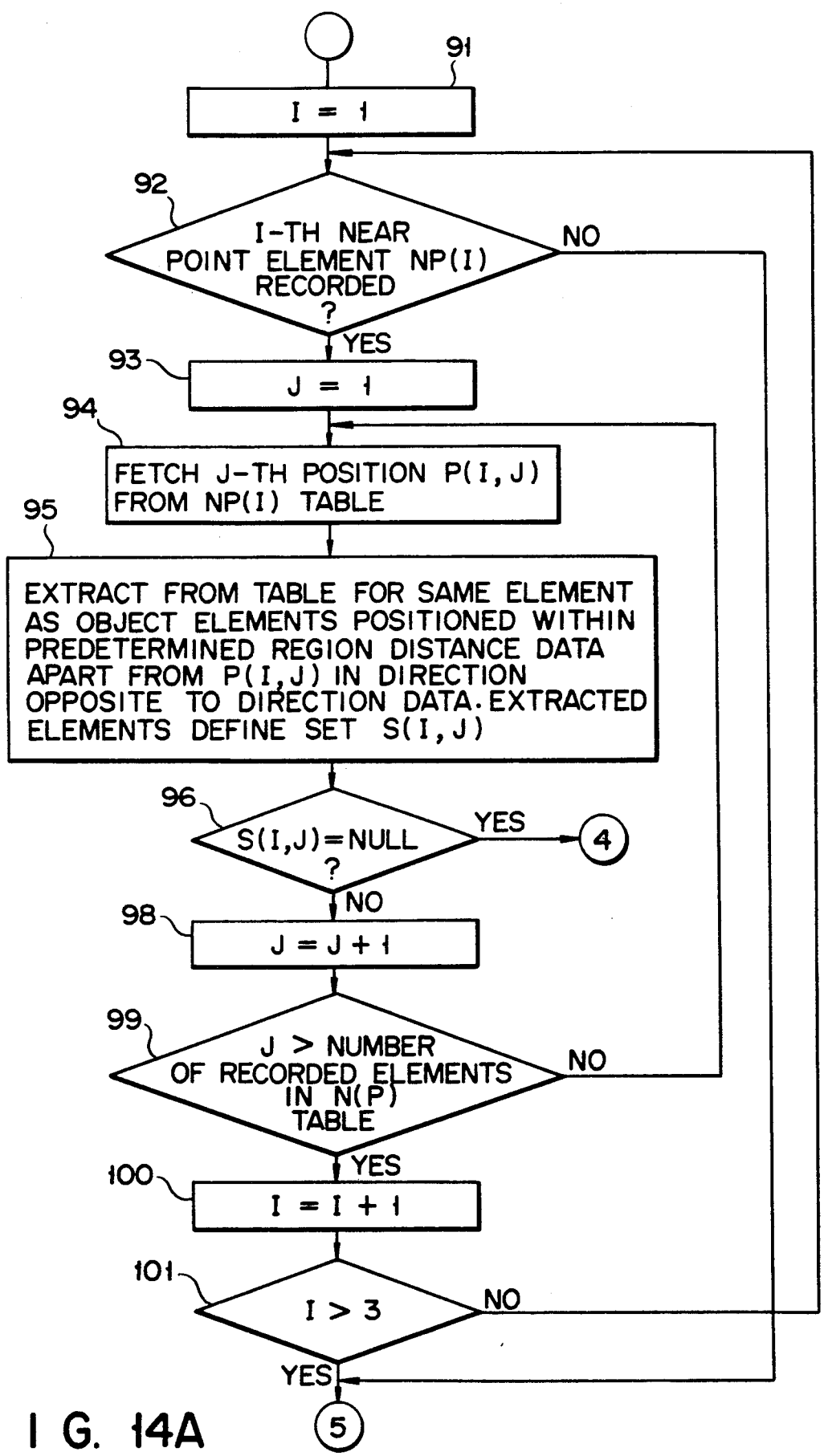
F I G. 14A

- CENTER COORDINATES OF TWO-INPUT AND ARE $(X_1, Y_1)$
- CENTER COORDINATES OF THREE-INPUT OR ARE $(X_2, Y_2)$
- OUTPUT OF TWO-INPUT AND IS CONNECTED TO SECOND INPUT OF THREE-INPUT OR
- COORDINATES OF TURNING POINTS ON CONNECTION LINE ARE $(X_3, Y_3)$ AND $(X_4, Y_4)$

FIG. 15A

RETRIEVAL OBJECT IS A HOUSE
POSITIONAL CONDITIONS

① A PARK IS 100m TO THE NORTH WEST THEREOF

② A NATIONAL ROUTE IS 100m (SHORTEST DISTANCE) TO THE EAST SOUTH THEREOF, RUNNING FROM NORTH EAST TO SOUTH WEST

③ A LOCAL ROUTE IS 100m (SHORTEST DISTANCE) TO THE SOUTH WEST THEREOF, RUNNING FROM NORTH WEST TO SOUTH EAST

④ A HOSPITAL IS 200m TO THE EAST THEREOF

FIG. 15B

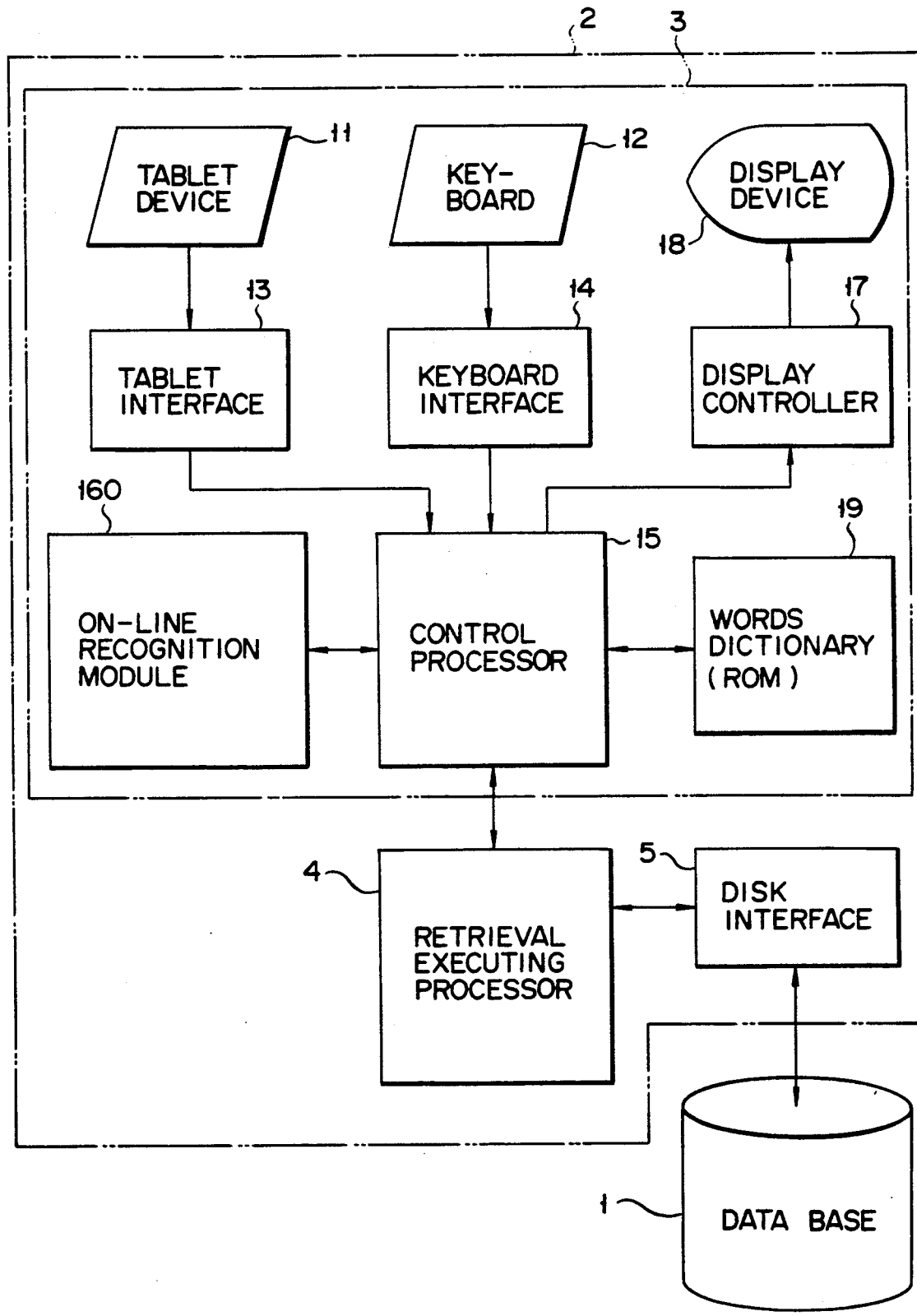
F I G. 16

INFORMATION RETRIEVAL APPARATUS AND INTERFACE FOR RETRIEVAL OF MAPPING INFORMATION UTILIZING HAND-DRAWN RETRIEVAL REQUESTS

This application is a continuation of U.S. patent application Ser. No. 07/470,409, filed on Jan. 29, 1990 now abandoned, which is a continuation of U.S. patent application Ser. No. 07/169,479, filed on Mar. 17, 1988, now abandoned.

BACKGROUND OF THE INVENTION

1. Field of the Invention

This invention relates to an information retrieval apparatus and an interface for information retrieval for use in a data base system, a file system, and a dictionary retrieval system. More specifically, this invention relates to an information retrieval apparatus and an information retrieval interface for handling requests for retrieving two-dimensional information such as maps, drawings of facilities, electric circuit diagrams, and chemical constitutional formulas.

2. Description of the Related Art

When information retrieval requests are entered in a data base storing image information such as drawings of facilities, electric circuit diagrams, and medical diagnostic drawings, such requests are made not only by the file name of a drawing or diagram but also by specifying the name of an element contained in a given drawing or the spatial arrangement of several such elements. For example, in the case of electric circuit diagrams, a request is made for retrieving a circuit diagram including a circuit in which a two-input NAND symbol and a three-input OR symbol are positioned at "A" in the diagram and interconnected in a relation like "B". In the case of maps, for example, a request is made for retrieving a house in which its name is "A", a "national route" and a "local route" run in its neighborhood, they intersect like "B", there is a park and a hospital at a distance of approximately "D" from the routes in the direction of "C", and it is in a positional relation of "E" with respect to these elements.

Conventionally, such retrieval is performed on the basis of a request using a command in general language form or a relational query language of a Special list form (refer to NING SAN CHANG and KING SUN FU: "Query-by-Pictorial-Example" IEEE Transaction on Software Engineering, vol. SE-6, No. 6, pp 519–524, November 1980.) This special type of retrieval language is designed on the basis of an analysis of retrieval requests which are expected to be made. However, in the method of entering retrieval requests in accordance with the retrieval languages having one-dimensional representation system, users must enter in detail a spatial and topological positional relationship between elements in accordance with many retrieval languages, in order to represent a two-dimensional positional relationship between plural elements forming image information. Thus, many data entries become needed for a retrieval request, degrading the processing efficiency. Moreover, the retrieval language itself is complicated. Therefore, the conventional retrieval-request entry method is difficult to use.

SUMMARY OF THE INVENTION

It is an object of this invention to provide an interface for information retrieval which enables users to simply and efficiently enter an information retrieval request based on a spatial and topological relationship between elements forming two-dimensional information.

It is another object of this invention to provide an information retrieval apparatus for efficiently retrieving two-dimensional information.

According to an aspect of this invention there is provided an information retrieval apparatus comprising entry means for entering an entry image for the retrieval request formed of elements of symbols, characters, diagrams, or the like; and retrieval request interpreting means for recognizing each of elements forming the entry image and obtaining a two-dimensional relationship between elements so as to determine retrieval conditions; and retrieval executing means for executing the retrieval of information which meets the retrieval conditions determined by the retrieval request interpreting means.

According to another aspect of this invention there is provided an information retrieval interface comprising entry means for entering an entry image for the retrieval request formed of elements of symbols, characters, diagrams, or the like; and retrieval table forming means for recognizing each of the elements forming the entry image and obtaining a two-dimensional relationship between elements so as to form a retrieval table representing a positional relationship between elements.

BRIEF DESCRIPTION OF THE DRAWINGS

This invention can be more fully understood from the detailed description when taken in conjunction with the accompanying drawings in which:

FIG. 1 is a block diagram of a data base system according to an embodiment of this invention;

FIG. 2 is a plan view of the tablet used in the data base system of FIG. 1;

FIG. 4C is a flowchart for processing character entries in the retrieval-request-entry processing flowchart;

FIG. 5 shows an example of a retrieval request diagram for electric circuit diagrams;

FIG. 6 is a flowchart for interpreting the retrieval request diagram for electric circuit diagrams;

FIG. 7 shows a retrieval table obtained by the interpreting process;

FIG. 8 shows tables stored in a data base for electric circuit diagrams to be examined by the retrieval table;

FIG. 9 is a flowchart for the retrieval execution process performed by the retrieval executing processor in the data base system using the retrieval table;

FIG. 10 shows an example of a retrieval request drawing for maps;

FIG. 12 shows a retrieval table obtained by the interpreting process;

FIG. 13 shows tables stored in a map data base to be examined by the retrieval table;

FIGS. 14A and 14B show a flowchart for the retrieval execution process performed by the retrieval executing processor in the data base system on the basis of the retrieval table;

FIGS. 15A and 15B show interpretive commands in an information retrieval system according to another embodiment of this invention, which result from the interpretation of a retrieval request diagram or drawing;

FIG. 16 is a block diagram of a data base system according to still another embodiment of this invention;

DETAILED DESCRIPTION OF THE PREFERRED EMBODIMENTS

Figure 3:
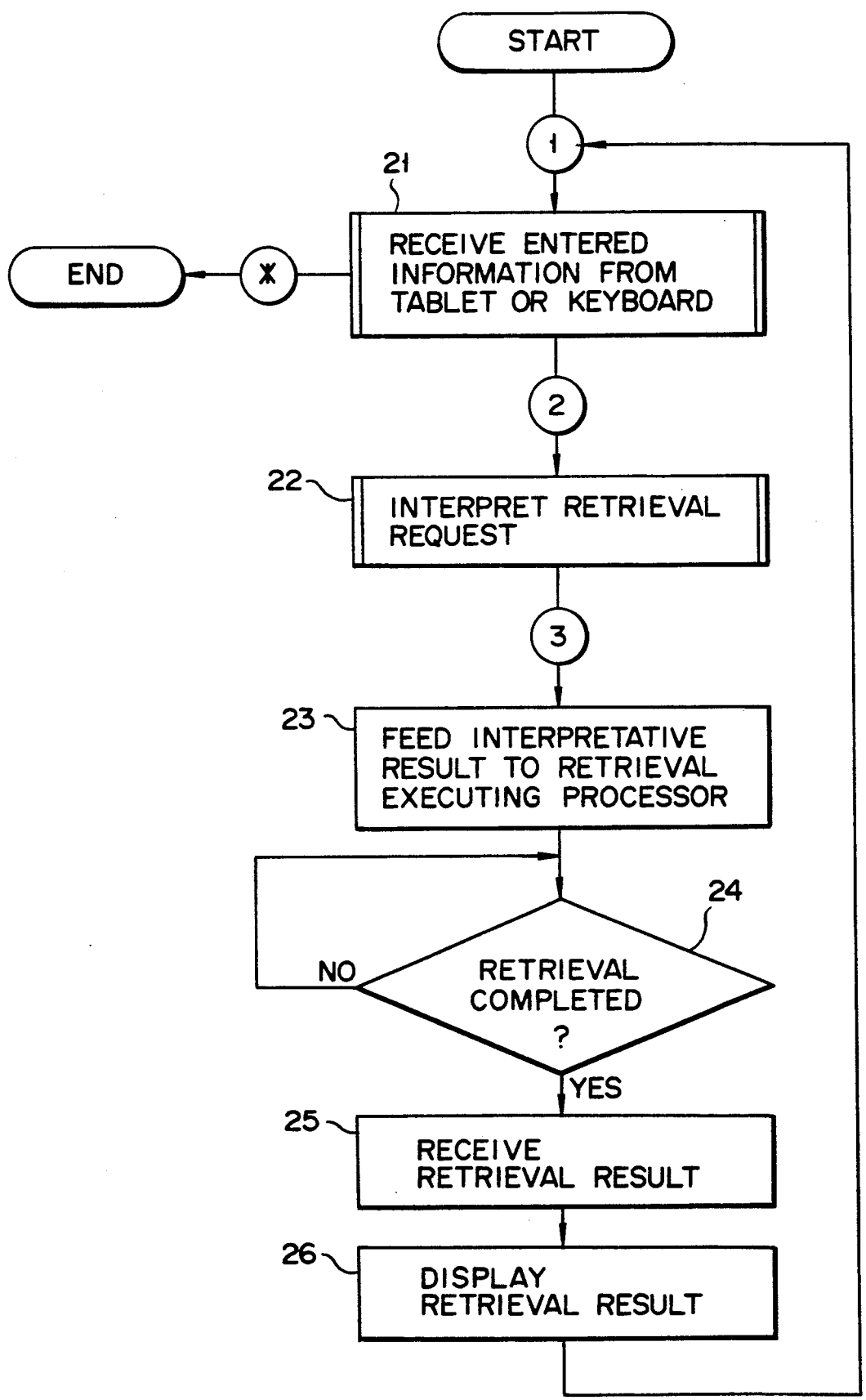
FIG. 3 is a main flowchart of the control processor of the data base system.

FIG. 1 is a block diagram of a data base system embodying this invention. The data base system is composed of a data base 1 for storing data to be retrieved, and an information retrieval unit 2 for retrieving data in data base 1. Information retrieval unit 2 is composed of an information retrieval interface 3 responsive to a retrieval request based on two-dimensional drawing information to determine retrieval conditions, a retrieval executing processor 4 for executing the retrieval of data in data base 1 in accordance with the retrieval conditions, and a disk interface 5 for transferring data between processor 4 and data base 1.

The arrangement of information retrieval interface 3 will described below. A tablet device 11 and a keyboard 12 constitute input or entry means used by user for entering an input drawing for a retrieval request. Tablet device 11 is adapted for entering a sketch drawn by hand as a retrieval request. The entered retrieval request is read into a control processor 15 via a tablet interface 13 or a keyboard interface 14. An on-line diagram/character (D/C) recognition module 16 is coupled to control processor 15. Control processor 15 drives the module and receives the recognition results of the retrieval request therefrom to send them to a display device 18 via a display controller 17. When instructed by user to execute the retrieval via tablet device 11, control processor 15 refers to a words dictionary (ROM) 19 as needed, and interprets the retrieval request so far entered to feed the interpretive result to retrieval executing processor 4. Thus, control processor 15, D/C recognition module 16 and words dictionary 19 form retrieval-request interpreting means.

Retrieval executing processor 4 searches data base 1 through disk interface 5 in accordance with the interpretive result. Data base 1 is an external file storage unit such as a magnetic disk unit or an optical disk unit in which large amounts of drawing information are stored for retrieval. The final information retrieved from data base 1 is fed to control processor 15. Control processor 15 transfers the retrieved information via display controller 17 to display device 18 which displays the retrieved information.

Figure 2:
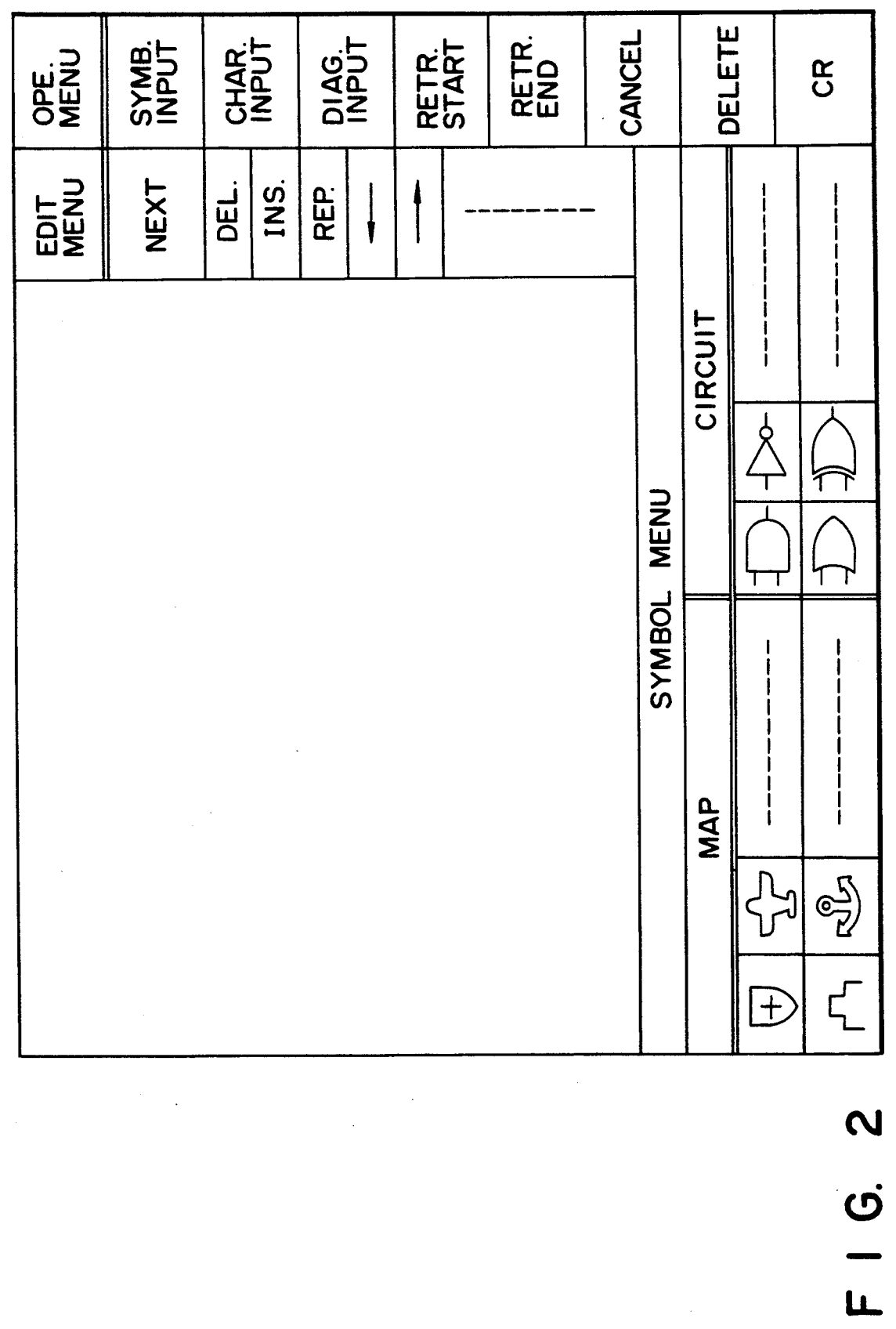

FIG. 2 shows, by way of example, tablet menus arranged on tablet device 11. User can advance a retrieval process by menu selection. The functions of the tablet menus will be described later. It is to be noted that entry means like tablet device 11 may be formed by displaying the drawing of FIG. 2 on the screen of display device 18. In this case, the menu selection can be performed by the use of a pointing device such as a mouse.

FIG. 3 is a flowchart for the processing to be executed by control processor 15. Upon receipt of a retrieval request from tablet device 11 or keyboard 12 in step 21, control processor 15 interprets the retrieval request in step 22, and then feeds the interpretive result to retrieval executing processor 4 in step 23. When retrieval executing processor 4 completes the retrieval in step 24 control processor 15 receives the retrieved information from retrieval executing processor 4 and displays it in step 26.

Figure 4A:
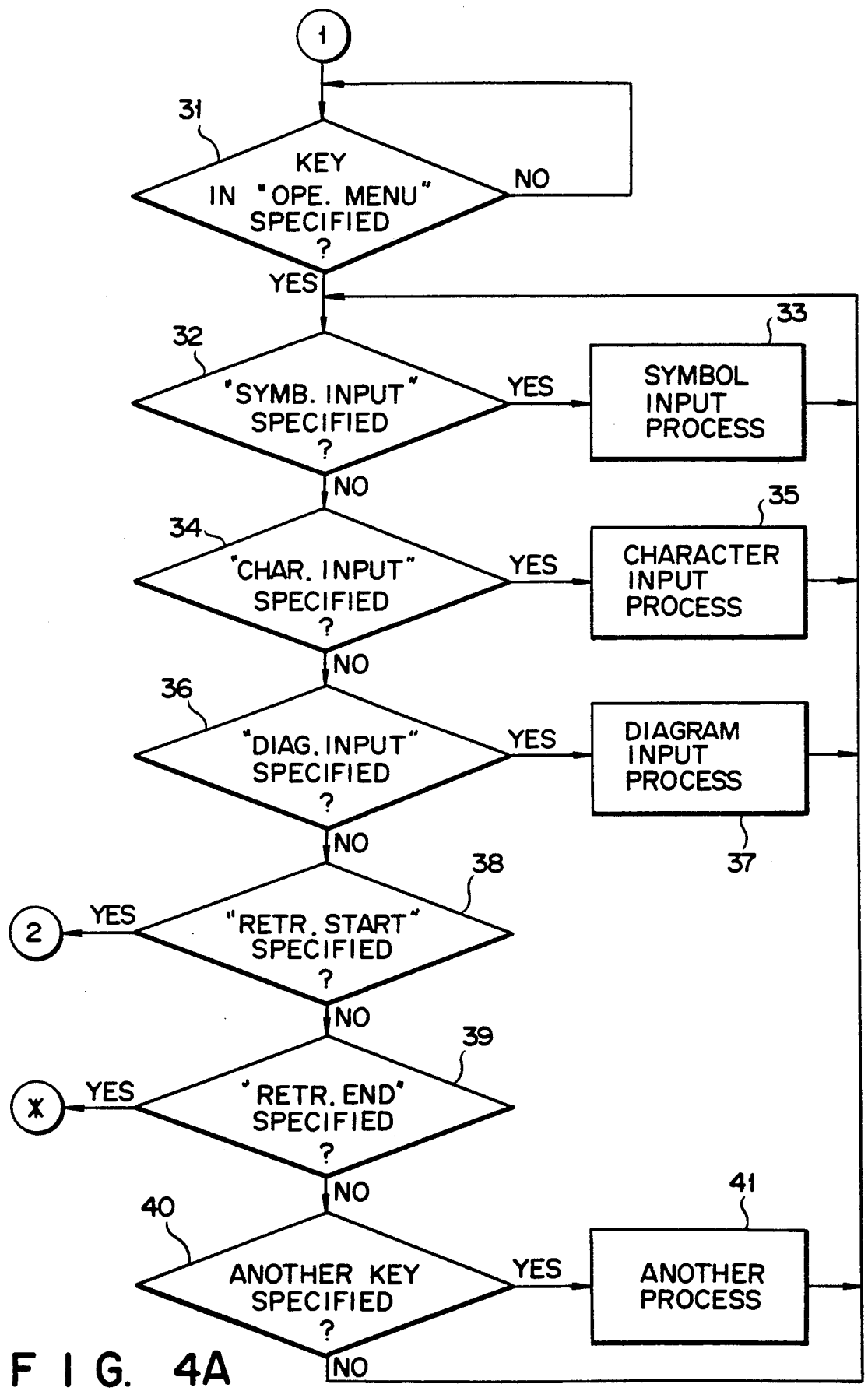
FIG. 4A is a flowchart for processing retrieval-request entries in the main flowchart.
Figure 4B:
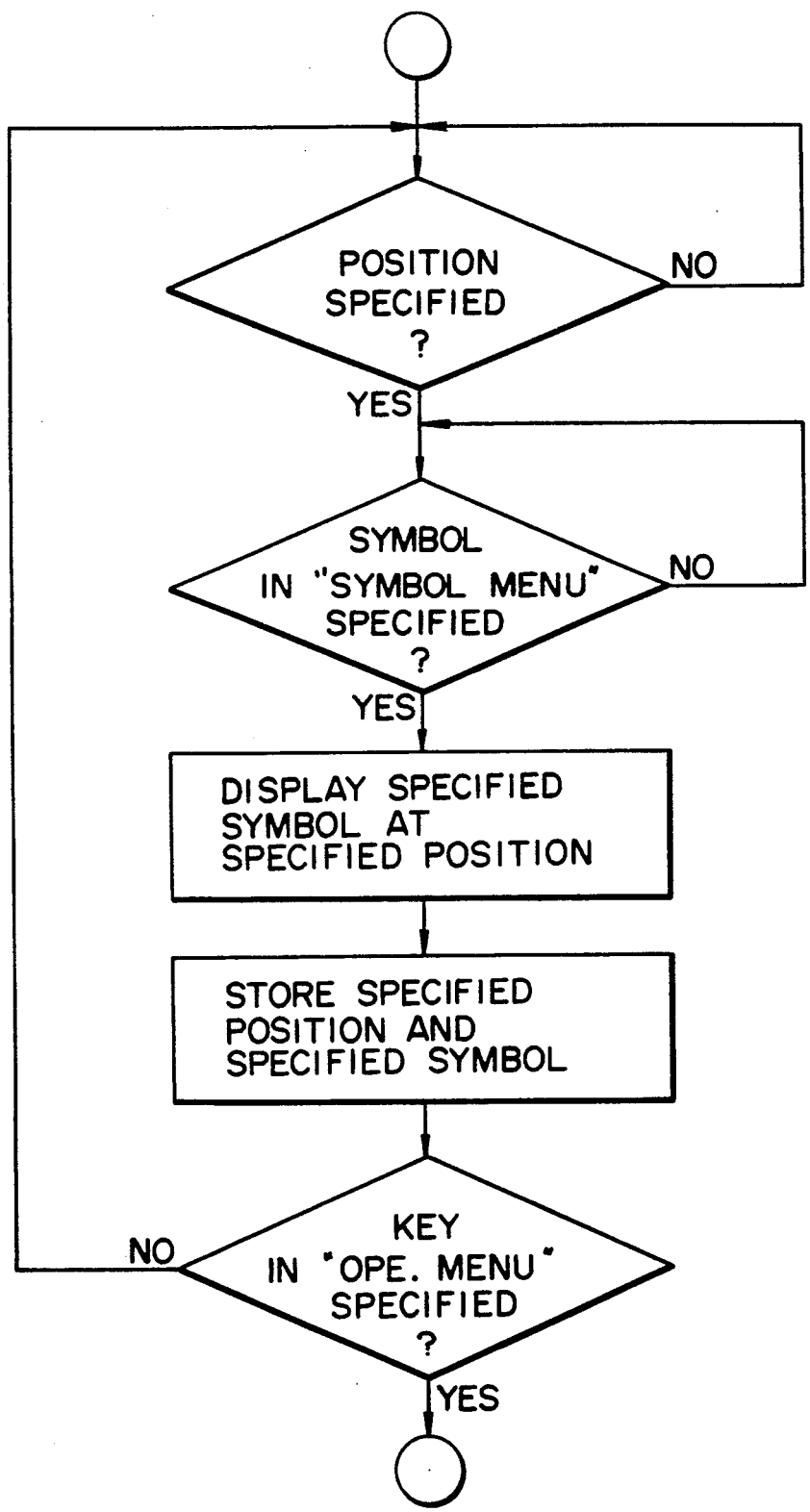
FIG. 4B is a flowchart for processing symbol entries in the retrieval-request-entry processing flowchart.

The detailed process for receiving input information from tablet device 11 or keyboard 12 in step 21 is represented in FIGS. 4A through 4D. As shown in FIG. 4A, when selecting any key in "Ope. Menu" of FIG. 2 in step 31 user can set the operation to a desired mode. That is, when "Symb. Input" is chosen in step 32 the symbol entry process is executed in step 33. Owing to the symbol entry process the specified symbol in the symbol menu is displayed at the specified position, and then stored as shown in FIG. 4B. When "Char. Input" is selected in step 34 the characterizing entry process is executed in step 35. In the character-string entry process, as shown in FIG. 4C, characters hand-written on the input plate of tablet device 11 are entered for each of strokes of one character to be recognized by on-line D/C recognition module 16, and the recognized characters are displayed at the position corresponding to the writing position. The recognized character string and the position thereof are stored.

Figure 4D:
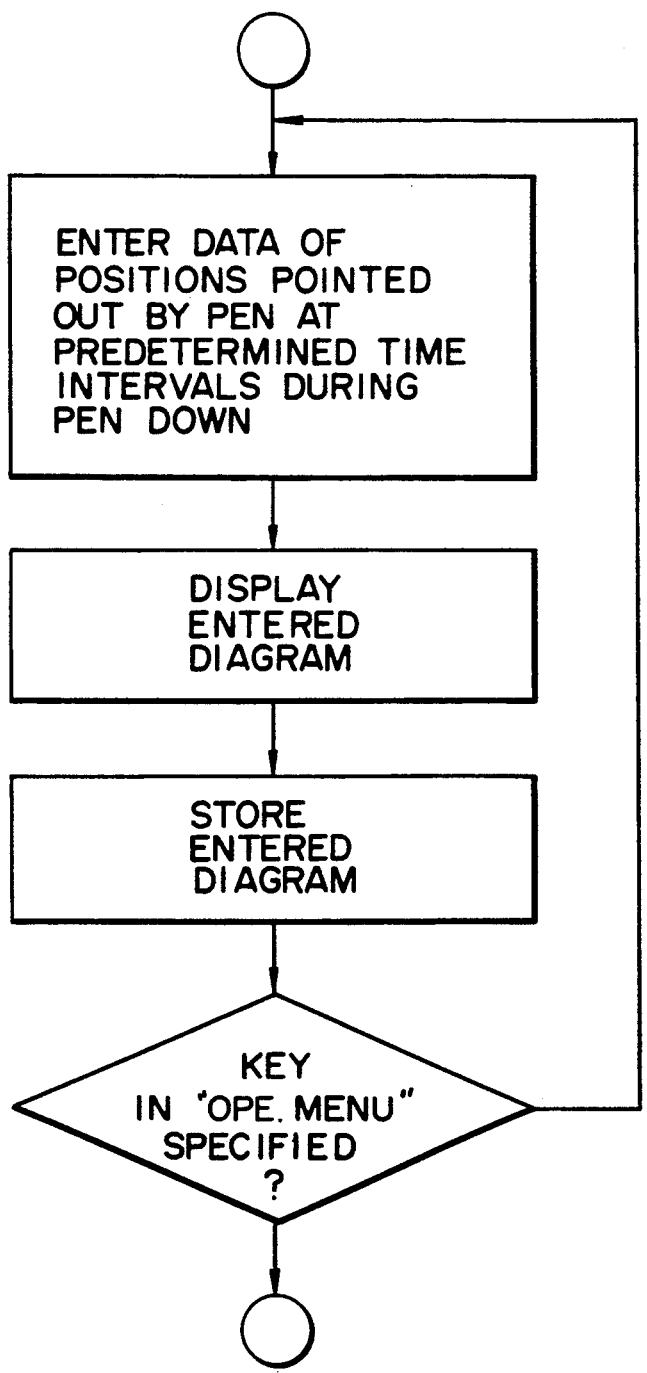
FIG. 4D is a flowchart for processing diagram entries in the retrieval-request-entry processing flowchart.

When "Diag. Input" is selected in step 36 the diagram input process is executed in step 37. In the diagram input process, as shown in FIG. 4D, while a pen is put down on the input plate of tablet device 11 the coordinates of positions pointed out by the pen are read at predetermined time intervals so that a diagram formed of a train of coordinates is displayed and stored.

When "Retr. Start" is specified in step 38 the operation advances to the process for interpreting the entered retrieval request as shown at (2). When "Retr. End" is selected in step 39 the process for completing the retrieval is executed as shown at (*). Finally, when another key is specified in step 40 another process is executed in step 41.

The "Cancel" key in the "Ope. Menu" is used for undoing the most recent operation, and the "Delete" key for undoing all the operations which have been performed, namely, for clearing the retrieval request entry. The "CR" key is used for specifying the end of the "Char. Input" operation. The keys in the "Symbol Menu" each correspond to the symbol of a element in a map or circuit diagram, and can be selected in the "Symb. Input" mode only. The keys in the "Edit Menu" can be selected during the "Char. Input" mode only. The "Next" key is used for specifying one out of some character candidates for recognition. The "Del", "Ins", and "Rep" keys are adapted for deieting, inserting, and replacing a character string entered, respectively The "←" and "→" keys are used for specifying the movement of a cursor in a specified direction. When user enters a retrieval request through operations of the keys the entered information is visually displayed by display device 18 for confirmation. To revise the displayed information user can operate a key or keys in the "Edit Menu" or the "Cancel" or "Delete" key in the "Ope. Menu". Thus, when the two-dimensional image information for a retrieval request is formed, the process (the step 22 in FIG. 3) for interpreting the retrieval request is performed by specifying the "Retr. Start."

FIG. 5 through FIG. 9 show an example of retrieval for an electric circuit diagram. In FIG. 5 there is shown an entered image of an electric circuit to be retrieved. A "two-input AND" and a "three-input OR" are entered by operating the symbol menu, and the connection lines are entered by hand-writing operation on the tablet in the "diagram input" mode.

FIG. 6 shows in detail the process (step 22 in FIG. 3) for interpreting the retrieval request from the electric circuit image of FIG. 5. First, in step 61, the coordinates of the center of each symbol are fit to the standard coordinates by normalization processing. A relationship of interconnection between the symbols is examined in step 62. The positions of bends (turning points) in a connection line between the symbols are extracted in step 63. And, in step 64, the center coordinates of the symbols, the relation of interconnection of the symbols, and the bend positions of the connection line between the symbols are provided for forming predetermined retrieval commands constituting logical conditions for retrieval, e.g. a retrieval table.

The thus formed retrieval table is shown in FIG. 7. The table has the items of ID No., ELEMENT, POSITION, and CONNECTION as shown. In the item ELEMENT the names of elements (code information) included in the retrieval request are recorded. The center coordinates of each element are recorded in the item POSITION, and the element ID Nos. connecting with input terminals and an output terminal of each element are recorded in the item CONNECTION. In this example, the number of input terminals that can be recorded is set at five, and the output terminal number is set at one.

In data base 1, on the other hand, electric circuit diagram data is stored in such a format as shown in FIG. 8. The electric circuit data of such a format is formed for each of electric circuit diagrams. The stored data is arranged in table form for each of elements such as "AND", "OR", "NAND", "NOR", and "TURNING POINT." Each data table has the items of ID No., ELEMENT, POSITION, and CONNECTION like the retrieval table. The relationship of connection of each element to another element is indicated by a pointer recorded in the item CONNECTION.

Upon receiving the retrieval table from interface 3, retrieval executing processor 4 searches all the diagram data stored in data base 1 from diagram to diagram in accordance with the process as shown in FIG. 9. More specifically, processor 4 fetches the No. 1 element and the position thereof in the retrieval table in step 71, in this example, "AND" and X1, Y1 so as to fetch all elements, as candidates, included in a small region centered at the position (X1, Y1) from a table corresponding to the No. 1 element ("AND" table) in the diagram data of interest. A set of fetched elements is defined as S(1) in step 72. If S(1) is null in step 73, then it is decided in step 74 that the diagram data does not meet the retrieval conditions, thus stopping the processing. If S(1) is not null, on the other hand, the processor performs the same processing for the next No. 2 element. This processing is performed for all elements (N; 4 in this example) in the retrieval table (steps 75, 76, 77).

After sets s(1), S(2), ..., S(N) have been found for each element, processor 4 finds a set of elements which meets the condition of CONNECTION in the retrieval table. The set is defined as SS in step 77. If SS is null in step 79, then it is decided that the diagram does not meet the retrieval conditions, while if SS is not null in step 79, then the diagram is output as the retrieval result. Thus, the diagram meeting the conditions in the retrieval table is searched for. The result of retrieval is displayed on display device 18 through processor 15.

FIG. 10 through FIG. 14 show an example of map retrieval. In FIG. 10 there is shown an entry image of a map to be retrieved. Character strings such as "north", "park", "house", "local route", "national route", "100 m" and "?" are entered in the characterizing entry mode. The symbol " " standing for a hospital is entered in the symbol entry mode, while others are entered in the diagram entry mode.

Figure 11:
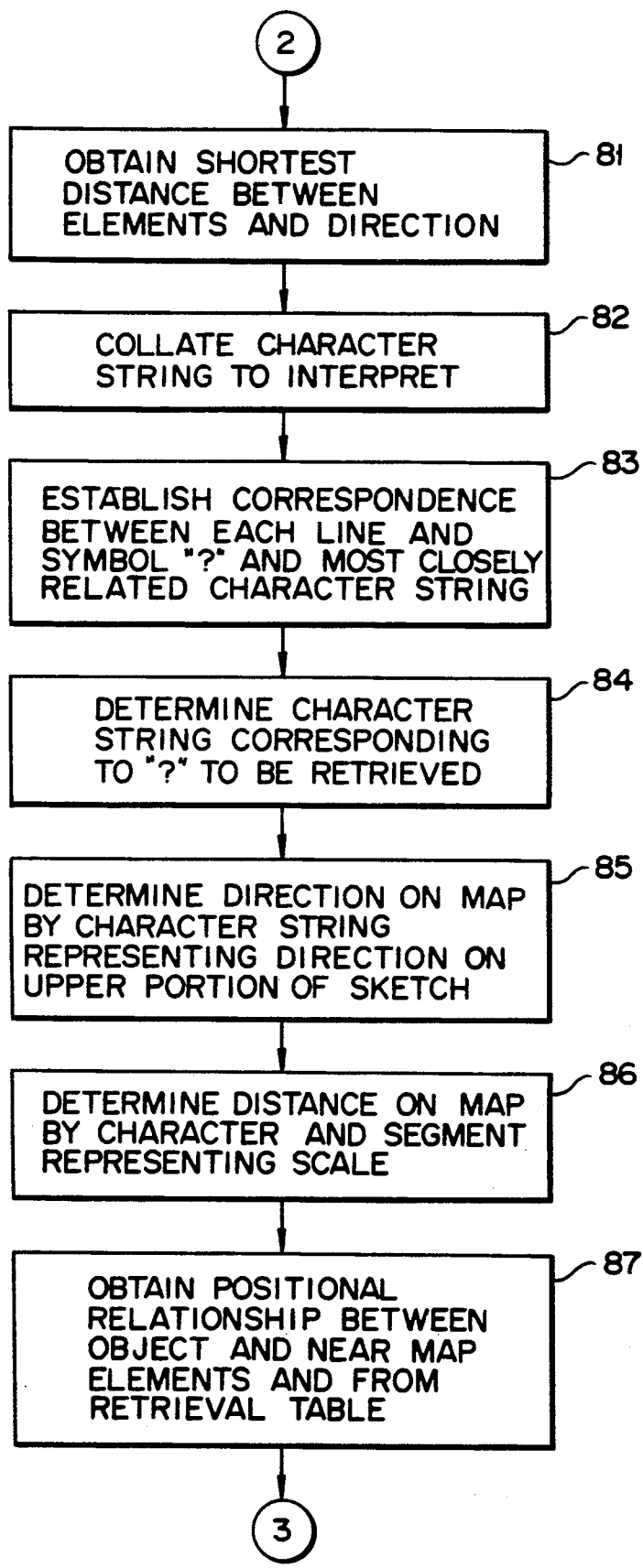
FIG. 11 is a flowchart for interpreting the map-retrieval request drawing.

FIG. 11 is a flowchart of the process for interpreting a map retrieval request. The interpreting process is comprised of calculating in step 81 the shortest distance between elements; collating in step 82 character strings with the words dictionary to interpret them; establishing in step 83 a correspondence between the most closely related character string and lines and symbol "?"; determining in step 84 that the character string corresponding to the "?" is to be retrieved; determining in step 85 the direction on the map; determining in step 86 the distance on the map; and finding in step 87 a positional relationship between the object to be retrieved and map elements in the neighborhood thereof to form a retrieval table.

An example of the retrieval table thus obtained is shown in FIG. 12. The table has the items of "object for retrieval", "near point elements" and "near line elements." For the near point elements, at most, three elements can be recorded, while for the near line elements, at most, two elements can be recorded. For each of the point elements, "element name", "direction", and "distance" are recorded. On the other hand, for each line element, "element name", "direction for shortest distance", and "Shortest distance" are recorded. Practically, the data is recorded in coded form in each item of the table.

In data base 1, map data is stored in such a format as shown in FIG. 13. The map data of such a format is formed for each Of maps. The stored data is arranged in table form for each of elements such as house, hospital, park, national route, and local route. Each table for point element has items of ID No., and POSITION, while each table for line element has items of ID No., and a train of position coordinates.

Figure 14B:
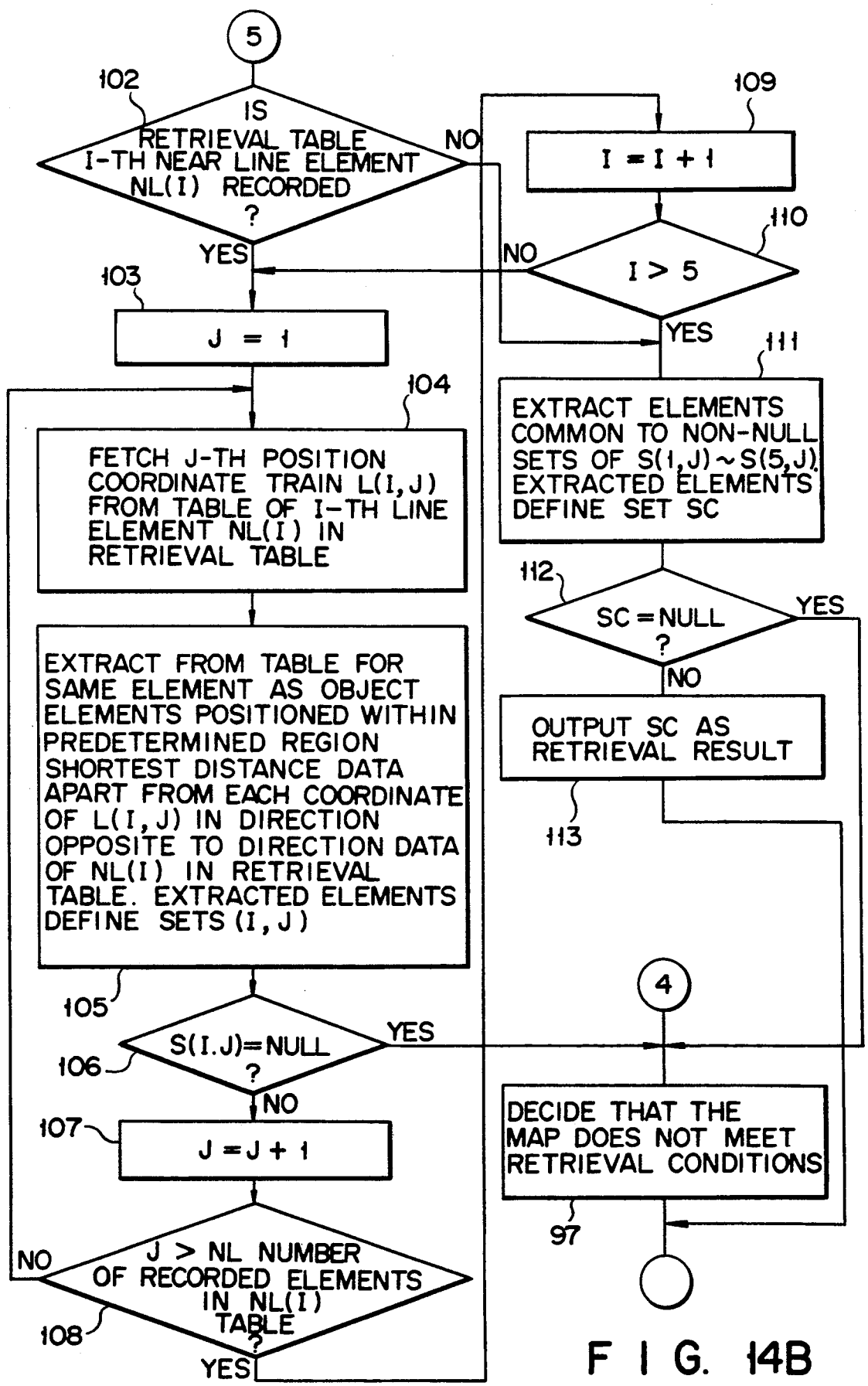

Upon receipt of the retrieval table from interface 3, retrieval executing processor 4 searches all the map data stored in data base 1 from map to map in accordance with the process shown in FIGS. 14A and 14B. More specifically, as shown in FIG. 14A, processor 4 fetches in step 91 a first near point element in the retrieval table for a decision in step 92 as to whether it is recorded or not. If it is not recorded, then line element processing is performed. If it is recorded, processor 4 fetches the first point element (NP(1); "park" in this example), and then fetches No. 1 position data P(1, 1) from a table (park table) corresponding to the point element in map data of interest in steps 93 and 94. Elements, which are positioned within a predetermined region centered at a point distance data (100 m) apart from the position data P(1, 1) in the opposite direction to the direction (north west) of NP(1) recorded in the retrieval table, are extracted from the table (house table) for the same element as the retrieval object in step 95. The extracted elements define a set S(1, 1). If S(1, 1) is null in step 96, it is decided that the map data does not meet the retrieval conditions, thereby terminating the process in step 97 of FIG. 15B. If S(1, 1) is not null, on the other hand, processor 4 performs the same processing for other position data P(1, 2), P(1, 3), P(1, n) in the table for NP(1) in steps 98 and 99. This processing is performed for all the recorded point elements in steps 100 and 101. After the completion of the process for the point elements the same process is performed for line elements in steps 102 through 110 shown in FIG. 14B. After sets S(1, J), S(2, J), S(5, J) have been found for each element, processor 4 extracts elements common to the sets which are not null. The set of the extracted elements is defined as SC in step 111. If SC is null in step 112 it is decided in step 97 that the map does not meet the retrieval conditions, while if SC is not null the map is output as the retrieval result in step 113. Thus, the map meeting the retrieval conditions is searched for. The retrieval result is displayed by display device 18 through control processor 15.

According to the retrieval processing as described above, a retrieval request can be entered in a two-dimensional image. Namely, user can enter a retrieval request in an intelligible form and in a timesaving manner. Besides, according to the apparatus as described above, a retrieval table adapted for the storage form of the data base is formed on the basis of a sketch so that an efficient retrieval can be performed.

The present invention is not limited to the above embodiments. FIGS. 15A and 15B each show an example of retrieval commands obtained by a retrieval language as the result of interpretation of the sketch obtained in step 22 of FIG. 3. In the case of the electric circuit sketch of FIG. 5, such retrieval conditions as shown in FIG. 15A are obtained. For the map sketch shown in FIG. 10, on the other hand, such retrieval conditions as shown in FIG. 15B are obtained. Once such retrieval conditions are formed, subsequent retrieval processing will be performed in a general manner.

In interpreting a sketch, not only the relationship between the shortest distance and the direction but also an intersectional relationship between lines and a topological relationship such as space division by lines can be introduced. In this case, the condition (4) in FIG. 15B will be "a hospital is 200 m to the east thereof with the national route between", and a condition (5) is added in which the national route and the local route intersects at a point, and the intersection is 100 m to the south east of the house for retrieval.

With the above embodiments the symbol entry method depends on menus selection system. Alternatively, the entry method may be of an on-line image recognition type as in characters. In this case, as shown in FIG. 16, the system comprises an on-line recognition module 160 adapted for recognizing hand-drawn symbols, characters, and diagrams.

Figure 17:
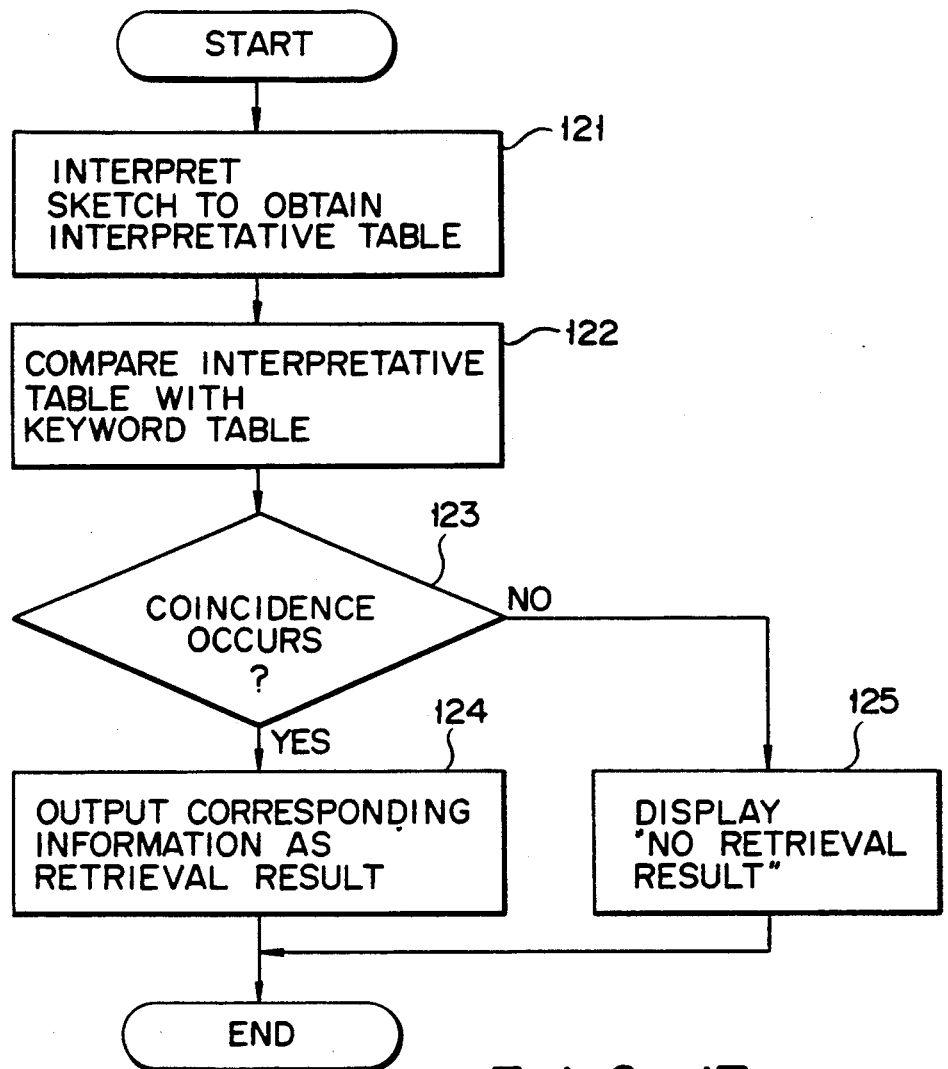
FIG. 17 is a flowchart for retrieval processing performed by a dictionary retrieval system according to a further embodiment of this invention.
Figure 18:
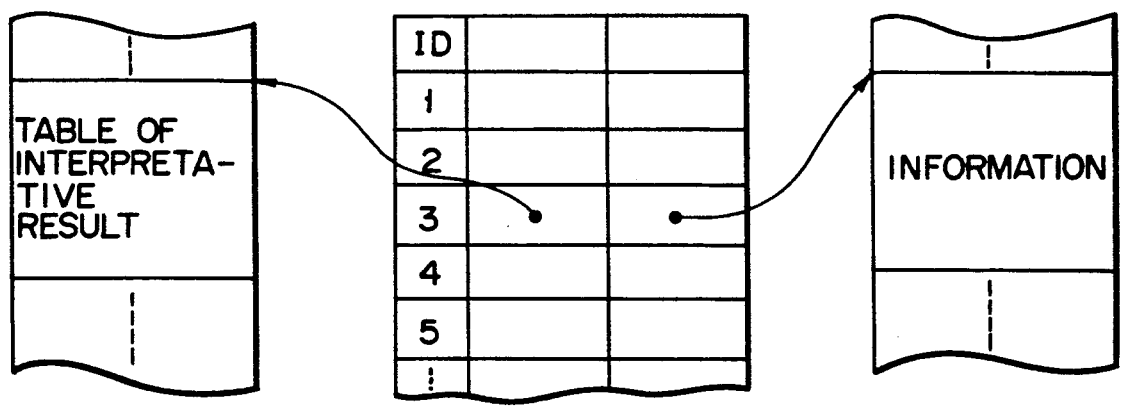
FIG. 18 shows a data structure in a keyword dictionary used in the dictionary retrieval system.

In the retrieval of electric circuit diagrams a partial circuit pattern is entered so as to retrieve a circuit diagram which includes the circuit pattern partially. However, the present invention is not limited to the retrieval of diagrams in particular. That is, the present invention may be applied to dictionary retrieval by handling a sketch as a two-dimensional keyword, for example. In FIG. 17 there is shown an example of a process for dictionary retrieval. First, a sketch is interpreted to obtain an interpretive table in step 121. A comparison is made between the interpretive table and a keyword table in step 122. The keyword table establishes a correspondence between table of interpretive result and corresponding information by the use of pointers as shown in FIG. 18, for example. As a result information is structured. The tables of interpretive result are read out in sequence from ID No. 1 of the keyword table, and are compared with the interpretive table. As a result of the comparison, if a coincidence occurs in step 123, then the corresponding information in the keyword table is output as the retrieval result in step 124. If no coincidence occurs in step 123, then "no result of retrieval" is displayed in step 125. Such dictionary retrieval can be applied to retrieval two-dimensional information based on chemical constitutional formulas, for example.

What is claimed is:

1. An information retrieval apparatus for retrieving a map, comprising:

an interface for entering a hand-drawn retrieval request, said hand-drawn retrieval request being formed of an object to be retrieved and other elements which are represented by at least a hand-drawn diagram, and representing a spatial positional relationship between the object and the other elements, said hand-drawn diagram comprising characters, a mark and a line, said characters representing at least one of names associated with the other elements and designations representing a direction of the hand-drawn diagram and a unit distance of the hand-drawn diagram, said mark being associated with the object and the other elements, said line being associated with the other elements and a length of the unit distance, said interface comprising entry means for entering said hand-drawn retrieval request, and retrieval request interpreting means for receiving said hand-drawn retrieval request, collating the object and the other elements in the hand-drawn diagram with a words dictionary and interpreting the spatial positional relationship between said object and said other elements based on coordinates of the object and the other elements to form a retrieval condition;

data base means for storing specific map data related to said object and said other elements;

retrieval executing means for executing an information retrieval based on said retrieval condition formed by said retrieval request interpreting means and the specific map data of said data base means, and outputting a desired retrieval result of the map around the object to be retrieved; and display means for displaying the desired retrieval result.

2. An information retrieval apparatus according to claim 1, wherein said entry means has symbol menus including plural selectable symbols by which said retrieval request can be formed by menu selection and means for transmitting a code for each selected symbol to said retrieval request interpreting means; and said retrieval request interpreting means includes means for recognizing said retrieval request on the basis of the code.

3. An information retrieval apparatus according to claim 1, wherein said entry means comprises a tablet device for enabling entry of hand-drawn elements; and said retrieval request interpreting means comprises recognizing means for recognizing said hand-drawn elements.

4. An information retrieval apparatus according to claim 1, wherein said retrieval request interpreting means forms a retrieval table as the retrieval condition.

5. An information retrieval apparatus according to claim 1, wherein said retrieval request interpreting means forms retrieval commands in language form as the retrieval condition.

6. A map retrieval interface for entering a hand-drawn retrieval request of the map, said retrieval request being formed of an object to be retrieved and other elements which are represented by at least a hand-drawn diagram, and representing a spatial positional relationship between the object and the other elements, said hand-drawn diagram comprising characters, a mark and a line, said characters representing at least one of names associated with the other elements and designations representing a direction of the hand-drawn diagram and a unit distance of the hand-drawn diagram, said mark being associated with the object and the other elements, said line being associated with the other elements and a length of the unit distance, the interface comprising:
   entry means for entering said hand-drawn retrieval request; and
   retrieval table forming means for receiving said hand-drawn retrieval request, collating the object and the other elements in the hand-drawn diagram with a words dictionary and interpreting the spatial positional relationship between said object and said other elements based on coordinates of the object and the other elements to form a retrieval table representing said spatial positional relationship between said object and said other elements.

7. An information retrieval interface according to claim 6, wherein said entry means has symbol menus including plural selectable symbols by which said retrieval request can be formed by menu selection and means for transmitting a code for each selected symbol to said retrieval table forming means; and said retrieval table forming means includes means for recognizing said retrieval request on the basis of the code.

8. An information retrieval apparatus according to claim 6, wherein said entry means comprises a tablet device for enabling entry of hand-drawn elements; and said retrieval table forming means comprises recognizing means for recognizing said hand-drawn elements.

9. An information retrieval apparatus comprising:
   entry means for entering a hand-drawn retrieval request, said hand-drawn retrieval request formed of an object to be retrieved and other elements which are represented by at least a hand-drawn diagram, said hand-drawn diagram comprising characters, a mark and a line, said characters representing names associated with the other elements and designators representing a direction of the hand-drawn diagram and a unit distance of the hand-drawn diagram, said mark being associated with the object and the other elements, said line being associated with the other elements and a length of the unit distance;
   retrieval request interpreting means for receiving said hand-drawn retrieval request, collating the object and the other elements in the hand-drawn diagram with a words dictionary and interpreting a spatial positional relationship between said object and said other elements based on coordinates of the object and the other elements;
   retrieval condition forming means for forming a retrieval condition based on said spatial positional relationship interpreted by said retrieval request interpreting means;
   data base means for storing specific data related to said object and said other elements;
   retrieval executing means for executing an information retrieval based on said retrieval condition formed by said retrieval condition forming means and the specific data of said data base means, and outputting a desired retrieval result; and
   display means for displaying the desired retrieval result.

* * * * *